United States Patent [19]

Howard, Jr. et al.

[11] Patent Number: 5,512,624
[45] Date of Patent: *Apr. 30, 1996

[54] IMPACT RESISTANT POLYTETRAFLUOROETHYLENE AND PREPARATION THEREOF

[75] Inventors: Edward G. Howard, Jr., Hockessin; Arthur Z. Moss, Wilmington, both of Del.

[73] Assignee: E. I. Du Pont de Nemours and Company, Wilmington, Del.

[*] Notice: the term of this patent shall not extend beyond the expiration date of Pat. No. 5,420,191.

[21] Appl. No.: 395,779

[22] Filed: Feb. 28, 1995

Related U.S. Application Data

[63] Continuation-in-part of Ser. No. 52,425, Mar. 30, 1993, abandoned, which is a continuation-in-part of Ser. No. 917,561, Jul. 21, 1992, abandoned.

[51] Int. Cl.$^6$ .............. C08K 5/02; C08L 27/12; C08F 14/26
[52] U.S. Cl. .......... 524/462; 524/463; 524/546; 525/199; 525/416; 526/255
[58] Field of Search .................. 524/462, 463, 524/546; 525/199, 416; 526/255

[56] References Cited

U.S. PATENT DOCUMENTS

| | | | |
|---|---|---|---|
| 2,720,498 | 10/1955 | Benning et al. | 260/33.8 |
| 3,981,853 | 9/1976 | Manwiller | 526/255 |
| 4,333,977 | 6/1982 | Abrahams et al. | 428/131 |
| 4,370,436 | 1/1983 | Nakamura et al. | 524/322 |
| 4,714,748 | 12/1987 | Hoashi et al. | 526/255 |
| 4,824,898 | 4/1989 | Sukigara et al. | 524/401 |
| 4,898,779 | 2/1990 | Yoshimura et al. | 428/402 |
| 5,115,026 | 5/1992 | Visca et al. | 525/199 |
| 5,420,191 | 5/1995 | Howard, Jr. et al. | 524/546 |

FOREIGN PATENT DOCUMENTS

| | | | |
|---|---|---|---|
| 201699 | 5/1990 | Hungary | B30B 15/00 |
| 53-055377 | 5/1978 | Japan | B29D 7/24 |

OTHER PUBLICATIONS

Chemical Abstract CA 113(22):192949n (Hungarian Appln. HU 51542 A1, published May 28, 1990).

Sperati, C. A., *High Performance Polymers: Their Origin and Development*, Soymour and Kirshenbaum, Editors, Elsevier Science Publishing, Inc., pp. 274–275 (1986).

Billmeyer, Jr., F. W., *Textbook of Polymer Science*, pp. 419–424 (1966).

*Primary Examiner*—Peter A. Szekely

[57] ABSTRACT

The invention provides shaped, substantially unoriented, compositions of PTFE, having high notched Izod impact resistance, produced in a hot compression molding process wherein heat and pressure are applied simultaneously in a selected temperature range below the melting point of the virgin, as polymerized PTFE powder.

13 Claims, 1 Drawing Sheet

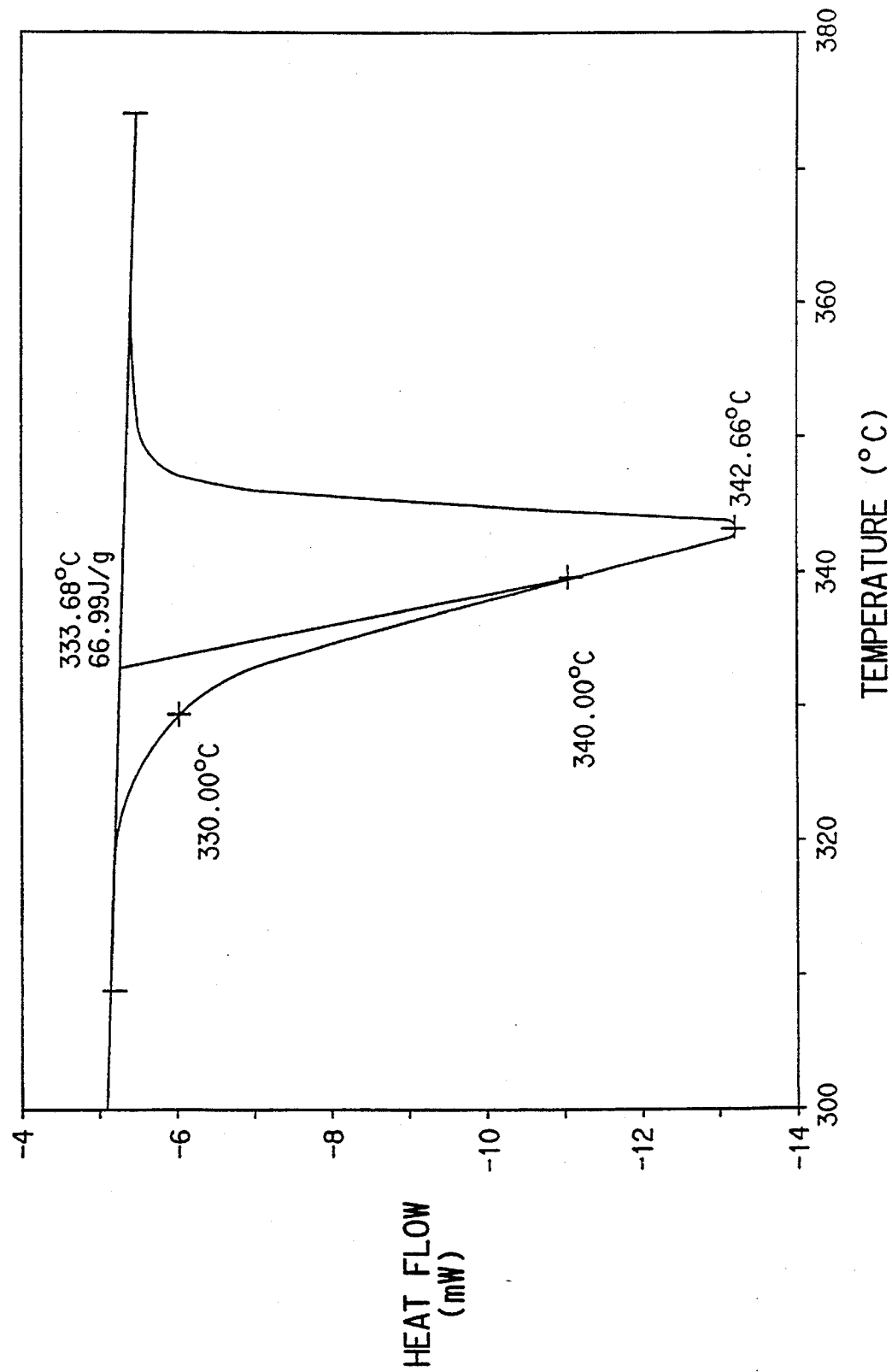

IMPACT RESISTANT POLYTETRAFLUOROETHYLENE AND PREPARATION THEREOF

This application is a continuation-in-part of Ser. No. 08/052,425, filed on Mar. 30, 1993, now abandoned, which is a continuation-in-art of Ser. No. 07/917,561, filed on Jul. 21, 1992, now abandoned.

FIELD

This invention relates to polytetrafluoroethylene (PTFE) and particularly to shaped compositions of PTFE having markedly improved resistance to fracture upon impact, and to a novel process for their fabrication.

BACKGROUND

PTFE is a well-known and highly useful polymeric material typically employed in various applications involving exposures to high temperatures and/or highly corrosive environments. However, certain mechanical properties of PTFE limit its usefulness. One such limiting property is resistance to fracture upon impact, so-called impact resistance. A widely accepted method for measuring the impact resistance of polymers is the "notched Izod" test, ASTM D256-90.

Commercially available PTFE is a thermoplastic polymer of unusually high molecular weight which cannot be fabricated using conventional techniques used with thermoplastic polymers of lower molecular weight, such as melt extrusion or injection molding. Instead, powder processing methods are typically applied to form shaped articles from PTFE. These powder processing methods include direct forming of shaped articles by cold compaction of PTFE powder, followed by "free sintering" at temperatures at or above the melting point of the virgin polymer; ram extrusion; paste extrusion; and high isostatic pressure processing. Most commonly, billets are formed by cold compaction and free sintering, followed by machining into the final shaped article. Shaped articles of PTFE, fabricated by conventional processing, exhibit notched Izod impact values of up to about 3.5 ft-lbs/inch of notch.

A processing method known as "hot compression molding" (HCM), involving simultaneous application of pressure and elevated temperature, without introducing significant orientation into the article, is commonly used for molding thermoplastic polymers other than PTFE homopolymer. HCM has not, however, been disclosed hitherto for fabricating PTFE. U.S. Pat. No. 4,824,898 discloses PTFE articles having Izod impact resistance of 19–60 kg-cm/cm of notch (3.5–11.0 ft-lb/in of notch) prepared by forming a "preform" by conventional cold compression and sintering at temperatures above 327° C. The preform is then converted into a highly oriented article such as sheeting by what is termed compression molding or extrusion molding at a temperature in the range of 150° C. to 340° C. This molding procedure, which differs markedly from HCM, involves extrusion through dies under plug flow conditions to introduce biaxial or multiaxial orientation into the article. The oriented article is then partly relaxed by heat-shrinking at 150° C. to 300° C. Articles produced by HCM are not oriented.

SUMMARY OF THE INVENTION

The present invention provides shaped, substantially unoriented, compositions of PTFE having high notched Izod impact resistance. Such shaped compositions may be produced by a hot compression molding process wherein heat and pressure are applied simultaneously in a selected temperature range below the melting point of the virgin, as polymerized PTFE powder.

Shaped PTFE compositions of this invention are substantially unoriented and have a notched Izod impact resistance of at least about 5 ft-lbs/inch of notch. One of the embodiments claimed herein also has at least about 50% but less than 100% of retained extended chain crystallinity. These compositions may be fabricated by compression molding powdered, virgin PTFE in the presence of 0 to about 15% by weight of one or more low molecular weight polyfluorinated substances at a temperature about 2° to 12° C. below the melting point of said PTFE powder and a pressure of at least about 100 psi (7 MPa).

DETAILS OF THE INVENTION

Shaped PTFE articles, that are substantially unoriented, and have substantially superior Izod impact resistance, compared to conventional PTFE articles, are fabricated by hot compression molding (HCM) of virgin PTFE powder at a temperature of about 2° C. to about 12° C. below the melting point of the virgin resin. It is believed that PTFE articles compression molded in that temperature range exhibit two distinct crystalline melting points, at about 342° C. and about 327° C., respectively, characteristic of the presence of both extended chain and folded chain crystalline morphology. Conventionally fabricated PTFE articles exhibit a single crystalline melting point at about 327° C. indicating folded chain crystalline morphology only.

In the practice of this invention, virgin PTFE powder, optionally in the presence of up to about 15% by weight of one or more low molecular weight polyfluorinated substances, is placed in a mold which in turn is placed between the heated platens of a hydraulic press, and simultaneously heated and compressed. This heating and compression is carried out at a temperature about 2° to 12° C. below the melting point of said PTFE powder and at a pressure of at least 1000 psi (6.9 MPa). Preferably the compression molding temperature is about 4° to 10° C. below the virgin PTFE melting point, and the pressure is about 3000 to 6000 psi (21 to 42 MPa). Preferably the low molecular weight polyfluorinated substance is present in the amount of 0 to about 10% by weight. Most preferably the polyfluorinated substance is absent. When present, the polyfluorinated substance is most preferably in the amount of about 0.1 to about 6% by weight. The process may optionally include other additives typically employed as process aids in the fabrication of PTFE such as oils and surfactants.

Hot compression molding in a mold, as described hereinabove, provides articles that are substantially unoriented. Useful measures of orientation in shaped articles are described in U.S. Pat. No. 4,824,898, which is incorporated herein by reference. Described in that patent, at column 8, line 22 and sequential lines are the terms "least maximum shrinkage ratio" and "average maximum expansion ratio".

The present application includes a shaped PTFE compositon that exhibits an average maximum expansion ratio of less than 2, preferably also having a least maximum shrinkage of 0.8 or greater.

The hot compression molding (HCM) technique has been used for molding thermoplastics other than PTFE. In the conventional application of HCM with non-PTFE polymers, however, the molding temperature is substantially above the polymer melting point. In the present invention, the virgin resin is formed and consolidated into shaped objects at temperatures below the melting point of the virgin resin. The hot compression molding procedure used to prepare the shaped articles of this invention does not introduce orientation into said articles. The invention articles are substantially unoriented.

For the purposes of this invention PTFE is taken to mean polytetrafluoroethylene that has a melting point of about 327° C. and a heat of fusion of no more than about 30 Joules/gram, which heat of fusion is determined from a specimen which has been heated at least 20° C. above its melting point and recrystallized from the melt at a cooling rate of 1° C./min from 20° C. above the melting point to about 250° C. or lower, said heat of fusion and melting point being determined by differential scanning calorimetry (DSC:ASTM D3418–82). "Melting Point" refers to the temperature at the peak of the DSC melting endotherm. By "PTFE powder" is meant virgin, as-polymerized PTFE which has never been melted and has a single melting point of about 342° C. and a heat of fusion of ca. 67 Joules/gram.

Typically, commercially available PTFE resin is believed to be of ultra-high molecular weight, with molecular weights estimated to be at least 10 million. By "low molecular weight polyfluorinated substance" is meant oligomeric PTFE having the formula $A(CF_2CF_2)_n$-R where R is a hydrocarbyl radical or $CF_2Cl$, A is H or $C_1$ and n is an integer and is at least about 10, preferably at least about 20, and perfluorocarbons of the formula $C_xF_{(2x+2)}$ wherein x is at least about 20. Suitable polyfluorinated substances are characterized by a molecular weight below about 50,000, a melting point below about 327° C. and a heat of fusion of at least 35 J/g, preferably about 60 J/g, and essentially no volatility at compression molding temperatures of the invention.

By "shaped article" is meant any article such as film, sheeting, gears, bushings, wheels, nozzles, rods, bars and the like, formed by thermal consolidation of the formed virgin resin powder in a batch, semi-continuous or continuous operation. A shaped article of this invention may also be an article cut or machined from an intermediate form which is itself a shaped article of this invention, such as a gasket cut from a sheet of this invention.

The highest temperature at which PTFE powder is consolidated to a shaped article according to this invention is within the range of about 2° to about 12° C., preferably about 4° to about 10° C. below the melting point of the virgin resin. The precise temperature employed within said range depends on the properties desired, as described below. At temperatures more than about 12° C. below the melting point of the virgin resin, it is found that insufficient consolidation takes place to allow forming a useful shaped article. At temperatures less than about 2° C. below the melting point of the virgin resin, impact strength is essentially equivalent to that of conventionally fabricated PTFE articles.

The minimum pressure for producing the shaped articles of this invention is not known. However, pressures in the range of 1000–10,000 psi (69–690 MPa) are operable, with pressures in the range of 3000–6000 psi (207–414 MPa) being preferred.

The products of this invention exhibit extended chain and folded chain morphology. While not being bound by any particular mechanism, the superior impact resistance exhibited by the PTFE products of this invention is thought to depend on the partial retention of the highly stable extended chain crystalline morphology characteristic of the virgin polymer and on precise temperature control.

It has been shown in other ultrahigh molecular weight polymers, such as polyethylene, that extended chain crystalline morphology imparts many improvements in properties over those associated with the more readily achievable folded chain morphology which these polymers have after recrystallization from the melt. It has been discovered in some embodiments of the present invention that markedly higher impact strength is exhibited by PTFE shaped articles wherein at least 50%, but less than 100%, of extended chain crystallinity of the virgin polymer is retained. Retention of a large amount of extended chain crystallinity may result in insufficient consolidation of virgin polymer particles to make a useful shaped article. Retention of too little extended chain crystallinity may lead to shaped articles outside the invention having properties essentially equivalent to those of conventionally fabricated PTFE shaped articles. The optimum content of extended chain crystallinity in the products of this invention depends on molecular weight, the geometry of the part, and the precise compression molding conditions, including molding temperature, pressure, heat transfer and cooling rate.

The DSC plot in FIG. 1 shows that within the temperature range for hot compression molding PTFE articles according to this invention (about 2° to 12° C. below the melting point of the virgin polymer), the percentage of melted extended chain crystals changes rapidly with temperature. Deviation by as little as 1° C. may significantly alter the percentage of extended chain crystals retained. Consequently, control of molding temperature is critical. Furthermore, without rigorous control, different parts of a single shaped article may experience different thermal histories, and hence exhibit different properties. Also, it is believed that in hot compression molding of PTFE, as practiced herein, final consolidation is achieved much more rapidly than in conventional cold compaction and free sintering.

In typical practice of this invention, virgin PTFE powder is placed in a mold at a temperature well below the melting point of the polymer, and smoothed to a uniform depth. The male part of the mold is placed on the powder and the mold placed between the pre-heated platens of the hydraulic press. To achieve optimum thermal and mechanical equilibration of the resin powder, and to minimize stresses in the consolidated part, the pressure and temperature are then raised gradually, in a step-wise fashion, to the final values selected for consolidation. The mold is then cooled slowly, preferably at a rate of 0.5–1.5° C./min, to about 250° C., below which temperature it may be rapidly quenched.

The following is a typical hot compression molding procedure for preparing a flat plaque according to the practice of this invention:

1. Preheat the platens to 230° C.
2. Fill mold with resin powder and smooth to uniform depth.
3. Place mold between platens and raise pressure to about 50 psi (3.5 MPa) or "contact" pressure—the lowest pressure indication on the press.
4. Hold 1 hour.
5. Still maintaining "contact" pressure, increase set points to final consolidation temperature.
6. Hold 60 minutes.
7. Increase pressure to final consolidation pressure.
8. Hold 30 minutes.
9. Leaving pressure on, reduce mold temperature by about 1° C./min to about 250° C.
10. Cool rapidly (quench) to room temperature.

In the following examples of the invention, and comparative examples not of the invention, temperatures are in degrees Celsius and percentages are by weight unless otherwise specified. The PTFE resin employed was Du Pont Teflon® Type 7A granular resin. Teflon® Type 7A exhibits a virgin resin melting point of 342° C. and a virgin polymer heat of fusion of about 67 Joules/gram. The oligomeric PTFE was Du Pont Vydax® 1000, having a molecular weight of about 26,000, a melting point of 322° C. and a heat of fusion of about 60 Joules/gram. Vydax® 1000 is supplied as a 7% solids dispersion; before being used as described below, the slurry was dried at 70° C. to yield a dry oligomer powder. All plaques were square, 3.5" edge length, and about ⅛" thick.

Deformation under load was determined essentially by the method of ASTM D621 method A. Tensile properties were determined by ASTM D638.

In examples wherein oligomeric PTFE was added to virgin ultra-high molecular weight PTFE, the percentage of retained extended chain crystallinity refers only to the ultra high molecular weight component having a melting point of about 342° C. It is expected that compression molding conditions within the specified temperature range but with combinations of pressure and dwell times other than those employed in the following examples will also be found to provide shaped articles of the invention. Such alternative combinations will be readily within the purview of those skilled in the art.

COMPARATIVE EXAMPLE 1

Virgin PTFE was formed into plaques by HCM. The mold was held for 1 hour at each of 230° C., 330° C., and 370° C. at contact pressure, followed by 30 minutes at 370° C., at 3.3 kpsi pressure It was then quenched at 0.9° C./min to 250° C. Samples were cut from the plaques for determination of properties. Results are shown in Table 1. 370° C. was well above the melting point of 342° C. of the virgin resin. No extended chain crystallinity was retained.

TABLE 1

PROPERTIES OF PTFE HOT COMPRESSION MOLDED AT 370°

| Izod Impact (ft-lbs/in) | Initial Modulus (kpsi) | Stress to Yield (kpsi) | Elongation to Break (%) | Tensile Toughness (kpsi) |
|---|---|---|---|---|
| 3.1 | 110 | 1.9 | 349 | 11.2 |

COMPARATIVE EXAMPLE 2

Virgin PTFE was formed into plaques by cold compaction at a pressure of 4.9 kpsi, removed from the mold and sintered in a Blue M model AGC-190F-MP1 inert gas oven. The plaques were heated at 1° C./min to 228° C., held 1 hour, then heated at 2° C./min to 327°–329° C., held 30 min, then heated at about 2° C./min to 367° C., held 90 min, then quenched at 0.5–1° C./min to 110° C. This process corresponds closely to that recommended in commercial literature for articles of comparable size and shape. 370° C. was well above the melting point of 342° C. of the virgin resin. No extended chain crystallinity was retained. Samples were cut from the plaques for determination of properties. Results are shown in Table 2.

TABLE 2

PROPERTIES OF COLD-COMPACTED PTFE FREE SINTERED AT 370° C.

| Izod Impact (ft-lbs/in) | Initial Modulus (kpsi) | Stress to Yield (kpsi) | Elongation to Break (%) | Tensile Toughness (kpsi) |
|---|---|---|---|---|
| 3.0 | 60 | 1.5 | 480 | 13.8 |

EXAMPLE 1

Virgin PTFE was formed into plaques by the process of Comparative Example 1 except that the 1 hour hold at 330° C. was eliminated, and the final consolidation temperature was 334° C. DSC analysis revealed that 67% of extended chain crystallinity had been retained. The Izod impact resistance was greater than 10 ft-lbs/inch (no break).

EXAMPLE 2

A second plaque was made by the process of Example 1. However, uncontrolled variation in processing conditions resulted in retention of 51% of extended chain crystallinity. Izod impact was 4.8 ftlbs/inch notch.

EXAMPLE 3

A third plaque was made by the process of Example 1 and evaluated for tensile properties. 69% of extended chain crystallinity was retained. Tensile properties are shown in Table 3.

TABLE 3

TENSILE PROPERTIES OF PTFE HOT COMPRESSTON MOLDED AT 334° C.

| Initial Modulus (kpsi) | Stress to Yield (kpsi) | Elongation to Break (%) | Tensile Toughness (kpsi) |
|---|---|---|---|
| 134 | 1.84 | 9.2 | 0.56 |

COMPARATIVE EXAMPLE 3

Virgin PTFE was formed into plaques by cold compaction and free sintering by the process of Comparative Example 2 except that the hold time at 228° C. was 105 minutes, the temperature of the second hold was at 322° C., and the final consolidation temperatures were as shown in Table 4. Samples were cut from the plaques for determination of impact resistance. Results are shown in Table 4.

TABLE 4

PROPERTIES OF COLD-COMPACTED PTFE FREE SINTERED BELOW THE MELTING POINT

| Sintering Temp (°C.) | Retained Extended Chain Crystallinity (%) | Izod Impact (ft-lbs/in) |
|---|---|---|
| 332 | 94 | 0.3 |
| 334 | 91 | 0.3 |
| 337 | 91 | 0.3 |
| 340 | 88 | 0.3 |

EXAMPLE 4

In this example, a small amount of oligomeric PTFE was incorporated into the ultrahigh molecular weight PTFE.

Vydax® 1000 was dry mixed by tumbling with PTFE to form a mixture containing 5% by weight of Vydax®. Plaques were formed by the process of Example 1 and samples cut for determination of impact strength. DSC analysis revealed that 72% of extended chain crystallinity was retained. The Izod impact resistance was greater than 8 ft-lbs/inch notch (no break).

COMPARATIVE EXAMPLE 4

In this example, a much larger amount of oligomeric PTFE was incorporated into the PTFE.

Vydax® 1000 was dry mixed with PTFE by tumbling to form a mixture containing 20% Vydax®. Plaques were fabricated by the process of Comparative Example 1 and samples were cut for determination of properties. Results are in Table 5. 370° C. was well above the melting point of 342° C. of the virgin resin. No extended chain crystallinity was retained.

TABLE 5

PROPERTIES OF PTFE CONTAINING 20% VYDAX ®
HOT COMPRESSION MOLDED AT 370° C.

| Initial Modulus (kpsi) | Stress to Yield (kpsi) | Elongation to Break (%) | Tensile Toughness (kpsi) |
| --- | --- | --- | --- |
| 135 | 1.1 | 42 | 0.4 |

COMPARATIVE EXAMPLE 5

The composition of Comparative Example 4 was formed into plaques by the process of Example 1 except that the final consolidation temperatures were as shown in Table 6. Samples were cut for determination of properties. Results are in Table 6.

TABLE 6

PROPERTIES OF PTFE CONTAINING 20% VYDAX ®
HOT COMPRESSTON MOLDED BELOW THE 340° C. MELTING POINT

| Molding Temperature (°C.) | Retained Extended Chain (%) | Izod Impact (ft-lbs/in) | Deformation Under Load (%) | Initial Modulus (kpsi) | Stress to Yield (kpsi) | Elongation to Break (%) | Tensile Toughness (kpsi) |
| --- | --- | --- | --- | --- | --- | --- | --- |
| 330.5 | 74 | 0.7 | 0.42 | NA | NA | NA | NA |
| 332 | 57 | 1.5 | 0.42 | BROKE | BROKE | BROKE | BROKE |
| 334 | 84 | 0.5 | 0.45 | 90 | 0.8 | 7.9 | 46 |

Samples were found to be quite fragile. Four out of five tensile specimens from the plaque fabricated at 332° C. broke at the first application of load; one of five broke from that fabricated at 334° C.

This comparative example illustrates the deleterious effect of low molecular weight material on final product properties, but also illustrates the optimization effect discussed hereinabove. The data in Table 6 show that under the fabrication conditions of this example, 57% retention of extended chain crystallinity in the PTFE represents an optimum for impact resistance.

What is claimed is:

1. A substantially unoriented, shaped PTFE composition prepared by hot compression molding consisting essentially of PTFE and 0 to about 15% by weight of one or more low molecular weight polyfluorinated substances, said composition characterized by a notched Izod impact resistance of at least about 5 ft-lbs/inch of notch.

2. A shaped PTFE composition of claim 1 further characterized by having at least 50% but less than 100% of retained extended chain crystallinity.

3. The shaped PTFE composition of claim 1, further exhibiting an average maximum expansion ratio of less than 2.

4. The shaped PTFE composition of claim 3, further exhibiting an average maximum expansion ratio of less than 2 and a least maximum shrinkage ratio of 0.8 or greater.

5. Composition according to claim 1 wherein the the low molecular weight polyfluorinated substance is present in the amount of 0 to about 10% by weight.

6. Composition according to claim 5 wherein the low molecular weight polyfluorinated substance is selected from the group consisting of oligomeric PTFE of the formula $A(CF_2CF_2)_nR$ wherein R is hydrocarbyl, A is H or Cl and n is at least about 10, and a perfluorocarbon of the formula $C_xF_{(2x+2)}$ wherein x is at least about 20.

7. Composition according to claim 6 wherein the polyfluorinated substance is oligomeric PTFE and n is at least about 200.

8. Composition according to claim 2 wherein the the low molecular weight polyfluorinated substance is present in the amount of 0 to about 10% by weight.

9. Composition according to claim 8 wherein the low molecular weight polyfluorinated substance is selected from the group consisting of oligomeric PTFE of the formula $A(CF_2CF_2)_nR$ wherein R is hydrocarbyl, A is H or Cl and n is at least about 10, and a perfluorocarbon of the formula $C_xF_{(2x+2)}$ wherein x is at least about 20.

10. Composition according to claim 9 wherein the polyfluorinated substance is oligomeric PTFE and n is at least about 200.

11. Process of preparing the composition according to claim 1 comprising hot compression molding powdered, virgin PTFE powder in the presence of 0 to about 15% by weight of one or more low molecular weight polyfluorinated substances at a temperature about 2° to 12° C. below the melting point of said virgin PTFE powder and a pressure of at least about 7 MPa.

12. Process according to claim 11 wherein the compression molding temperature is about 4° to 10° C. below the virgin PTFE melting point.

13. Process according to claim 11 wherein the compression molding pressure is about 21 to about 42 MPa.

* * * * *